United States Patent
Lin et al.

(10) Patent No.: US 12,430,783 B2
(45) Date of Patent: Sep. 30, 2025

(54) ASSISTIVE DEPTH OF FIELD ANALYSIS

(71) Applicant: HEWLETT-PACKARD DEVELOPMENT COMPANY, L.P., Spring, TX (US)

(72) Inventors: I-Chen Lin, Taipei (TW); Chung-Chun Chen, Taipei (TW); Cheng-Fang Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 530 days.

(21) Appl. No.: 17/891,739

(22) Filed: Aug. 19, 2022

(65) Prior Publication Data
US 2024/0062399 A1    Feb. 22, 2024

(51) Int. Cl.
G06T 7/55 (2017.01)
G06F 21/32 (2013.01)
G06V 40/16 (2022.01)

(52) U.S. Cl.
CPC ............... *G06T 7/55* (2017.01); *G06F 21/32* (2013.01); *G06V 40/161* (2022.01); *G06T 2207/10028* (2013.01)

(58) Field of Classification Search
CPC . G06T 7/55; G06T 2207/10028; G06F 21/32; G06V 40/161; G06V 40/172; H04N 25/47; H04N 25/707; H04N 23/667; H04N 23/959; H04N 5/2226
See application file for complete search history.

(56) References Cited

U.S. PATENT DOCUMENTS

| | | | |
|---|---|---|---|
| 10,270,962 B1 * | 4/2019 | Stout | H04N 23/62 |
| 11,489,866 B2 * | 11/2022 | Streit | G06F 21/32 |
| 12,099,480 B1 * | 9/2024 | Gupta | G06F 16/9024 |
| 2015/0181111 A1 * | 6/2015 | Stewart | H04N 23/611 |
| | | | 348/211.8 |
| 2018/0286020 A1 * | 10/2018 | Kawai | H04N 23/958 |
| 2020/0077100 A1 * | 3/2020 | Chao | H04N 19/182 |
| 2021/0089638 A1 * | 3/2021 | Seiler | G06F 3/017 |
| 2022/0141522 A1 * | 5/2022 | Saraf | G06F 3/1446 |
| | | | 348/564 |
| 2022/0159193 A1 * | 5/2022 | Mizuochi | H04N 23/633 |

FOREIGN PATENT DOCUMENTS

| | | | | |
|---|---|---|---|---|
| CN | 116783629 A | * | 9/2023 | G06V 10/145 |
| JP | 2004312477 A | * | 11/2004 | C02F 3/00 |
| TW | 201503689 A | * | 1/2015 | H04N 23/56 |

* cited by examiner

*Primary Examiner* — Lin Ye
*Assistant Examiner* — Steven Daniel Barry
(74) *Attorney, Agent, or Firm* — Quarles & Brady LLP (57) ABSTRACT

In some examples, a non-transitory computer-readable medium stores machine-readable instructions which, when executed by a controller of an electronic device, cause the controller to perform an assistive depth of field analysis. Performing the assistive depth analysis causes the controller to receive images from an image sensor, determine, via artificial intelligence (AI) processing, a depth of field of the images, and generate a signal representing consecutive changes in the depth of field of the images with respect to a first of the images.

16 Claims, 5 Drawing Sheets

ASSISTIVE DEPTH OF FIELD ANALYSIS

BACKGROUND

Electronic devices such as desktops, laptops, notebooks, tablets, and smartphones include executable code that enables users to activate assistive technologies. These assistive technologies, or accessibility features, can aid a user interacting with the electronic devices.

BRIEF DESCRIPTION OF THE DRAWINGS

Various examples will be described below referring to the following figures.

DETAILED DESCRIPTION

Assistive technologies, or accessibility features, may utilize features of electronic devices such as a microphone, camera, accelerometer, or combinations thereof to receive input from a user. Such assistive technologies may improve a user experience of a user interacting with the electronic devices for users who experience difficulty in interacting with the electronic devices via approaches such as pressing keys on a keyboard, precise control of a computer mouse, etc.

In some instances, the assistive technologies utilize image input of the electronic device. For example, a camera may capture an image and provide it to a processing engine for analysis. Based on that analysis, an operation of the electronic device may be performed. The processing engine may be implemented as a dedicated component or components, such as artificial intelligence (AI) processing components. An always-on camera may capture images and provide those images to the processing engine for analysis, but not provide the images to an operating system (OS) of the electronic device, unless the user provides control inputs to cause the images to be provided to the OS. By preventing the images from being provided to the OS automatically from the always-on camera, user privacy of the electronic device is increased while also increasing functionality provided by the electronic device, such as via utilization by the processing engine of data captured via the always-on camera.

In some examples, the processing engine implements the assistive technologies by performing a depth of field analysis according to AI processes. For example, an image provided by the camera that is clear (e.g., not blurry or in motion) and stable may be established as a reference image. Responsive to a change in image stability as determined by a measured depth of field of the image, the processing engine generates serial signal pulses corresponding to the change in stability. For example, responsive to the image being clear or stable (such as is within a threshold clarity of the reference image), the processing engine provides the serial signal having a value of 0. Responsive to the image being not clear (e.g., having jitter resulting from movement of the camera, being unclear due to user movement, such as a hand, in front of the camera, etc.), the processing engine provides the serial signal having a value of 1. The serial signal pulses form a digital signal which may be analyzed. Responsive to the digital signal matching a programmed pattern, the electronic device performs a function. For example, responsive to the digital signal matching the programmed pattern, the electronic device performs a programmed actions (e.g., executes a command, opens/closes an application, unlocks/locks the OS, activates a system shortcut, etc.). In some examples, an identity of the user is ascertained via the camera and verified as authorized prior to performance of the function by the electronic device.

In some examples in accordance with the present description, an electronic device is provided. The electronic device includes an image sensor and a controller. The controller is to receive images from an image sensor including a first image and additional images and perform an assistive depth of field analysis to determine a depth of field of the first image, store the depth of field of the first image as a reference value, determine a depth of field of the additional images, and generate a serial signal representing a change in the depth of field of the additional images with respect to the reference value.

In some examples in accordance with the present description, an electronic device is provided. The electronic device includes an image sensor and a controller. The controller is to perform an assistive depth of field analysis to receive images from the image sensor, determine a depth of field for the images, and generate a binary pattern representing a comparison of the depth of field for the images consecutively to a reference value. The electronic device is to execute a programmed function corresponding to the binary pattern in response to the binary pattern matching a programmed value.

In some examples in accordance with the present description, a non-transitory computer-readable medium storing machine-readable instructions is provided. The instructions, when executed by a controller of an electronic device, cause the controller to perform an assistive depth of field analysis to receive images from an image sensor, determine, via AI processing, a depth of field of the images, and generate a signal representing consecutive changes in the depth of field of the images with respect to a first of the images.

Figure 1:
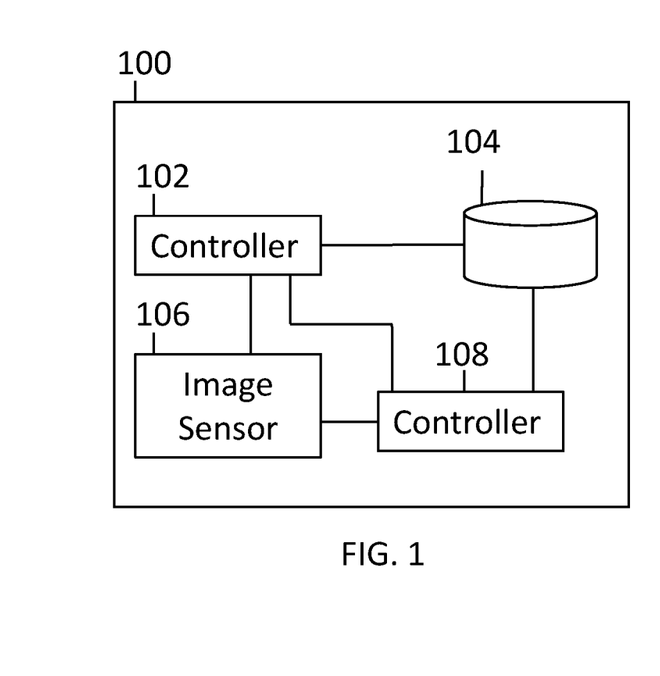
FIG. 1 shows a block diagram of an electronic device, in accordance with various examples.

Referring now to FIG. 1, a block diagram of an electronic device 100 is shown, in accordance with various examples. The electronic device 100 is, for example, a laptop computer, a notebook computer, an all-in-one (AIO) computer, an external display for a computer, a tablet device (with or without a docking station), a smartphone, a peripheral device, or the like. The electronic device 100 includes a controller 102, a storage device 104, an image sensor 106, and a controller 108. The controller 102 is a processor, microcontroller, a microcomputer, a microcontroller, a programmable integrated circuit, a programmable gate array, an embedded circuit, or other suitable device for managing operations of the electronic device 100 or operations of a component or multiple components of the electronic device 100. The storage device 104 is a hard drive, a solid-state drive (SSD), flash memory, random access memory (RAM), or other suitable memory for storing data or machine-readable instructions of the electronic device 100.

The image sensor 106 is a camera, a sensor, or any other suitable circuit, device, or component capable of capturing image data. In some examples, the electronic device 100 includes multiple image sensors 106. The image sensor 106 may be capable of determining, capturing, or otherwise providing depth of field information for a viewed area. In some examples, the image sensor 106 includes processing capability, such as an image signal processor (ISP) or other logic, capable of processing, manipulating, analyzing, or otherwise interacting with image data captured by the image sensor 106. The controller 108 is a processor, microcontroller, a microcomputer, a microcontroller, a programmable integrated circuit, a programmable gate array, an embedded circuit, or other suitable device for performing AI processing or operations, such as on data received from the image sensor 106. Accordingly, the controller 108 may provide vision AI features to the electronic device 100 and/or implement a vision AI framework that facilitates AI processing by the electronic device 100 of data captured and/or provided by the image sensor 106. In some examples, the controller 108 is separate and distinct from the controller 102 such that the controller 108 may receive and process data that is not provided to the controller 102 and/or to which the controller 102 may lack access or authorization to access.

In some implementations, the image sensor 106 may be powered substantially continuously while the electronic device is in an on state, such as times in which the electronic device is powered on and not in a sleep or otherwise suspended state. While powered, the image sensor 106 captures image data. The image data is processed by the image sensor 106, provided to the controller 108 for processing by the controller 108, or a combination thereof. In some examples, the processing determines whether the image data is clear or is not clear. The processing is, in some examples, performed according to an AI process, machine learning process, or the like. The determination may be made based on a depth of field analysis of the image data. The depth of field analysis identifies a depth of field of the image data based on focal length of the image sensor 106, a distance from the image sensor 106 to a subject of the image data, an acceptable circle of confusion size (e.g., diameter), an aperture of the image sensor 106, or a combination thereof.

Based on the depth of field analysis, a determination is made as to whether the image data is clear or not clear. For example, the determined depth of field varying from a threshold or reference value indicates that the image data is not clear. The determined depth of field not varying (e.g., being substantially the same as) the threshold or reference values indicates that the image data is clear. Based on the processing, a data stream is provided. The data stream may be a serial data stream which indicates, via a binary value or bit value, whether a given frame of the image data is determined to be clear or not clear. For example, a first binary value indicates that an image represented by the image data is clear and a second binary value indicates that the image represented by the image data is not clear (e.g., is blurry, has an amount of jitter greater than a threshold amount, has an amount of motion greater than a threshold amount, etc.). In some examples, the depth of field of the image data is varied by a user moving a hand, an arm, an object, or the like in front of the image sensor 106. In another examples, the depth of field of the image data is varied by moving the image sensor 106.

In an example, the threshold or reference value is determined during a calibration operation of the image sensor 106. The calibration operation is performed, for example, responsive to the electronic device 100 transitioning from a powered-off state to a powered-on state. In another example, the calibration operation is performed responsive to the electronic device 100 transitioning from a sleep, hibernating, suspended, or otherwise inactive state to an active or awake state. The calibration operation captures an image via the image sensor 106 and designates that image as a reference image for comparison to subsequent captured images.

In an example, the controller 108 analyzes the data stream to determine whether the data stream, or data of the data stream (e.g., a consecutive string of individual bits of the data stream), matches a programmed value. The programmed value may be obtained from a data store, database, a look-up table, or other data structure, storage device, storage location, or combination thereof. Responsive to the data stream, or data of the data stream, matching the programmed value, the controller 108 provides an instruction to the controller 102. The instruction corresponds to the programmed value. For example, the instruction may be a command to be executed by the controller 102, a series of commands to be executed by the controller 102, a shortcut for multiple operations to be performed by the controller 102, or the like.

In some examples, subsequent to the image sensor 106 beginning to capture image data, an authentication operation may be performed. For example, based on the image data, an identity, and therefore authentication status, of a user of the electronic device 100 may be determined. In an example, the authentication is performed based on facial detection performed on image data captured by the image sensor 106.

In some examples, the storage device 104 stores the programmed value. The storage device 104 may also store a data base of commands or instructions corresponding to programmed values. In some examples, the storage device 104 is a non-transitory computer-readable medium storing machine-readable instructions. The computer-readable instructions may be executable by the controller 102.

Figure 2:
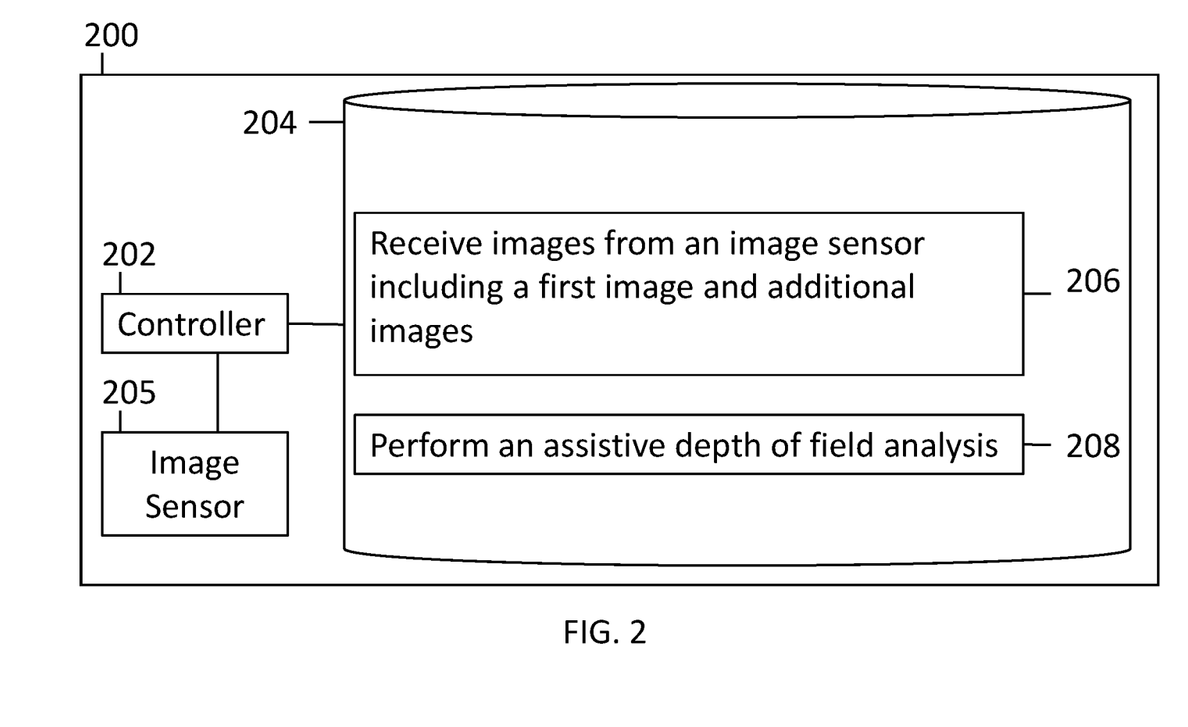
FIG. 2 shows a block diagram of an electronic device, in accordance with various examples.

Referring now to FIG. 2, a block diagram of an electronic device 200 is shown, in accordance with various examples. The electronic device 200 is the electronic device 100, for example. The electronic device 200 includes a controller 202, a non-transitory machine-readable medium 204, and an image sensor 205. The controller 202 is the controller 108, for example, and the non-transitory machine-readable medium 204 is the storage device 104, for example. The image sensor 205 is the image sensor 106, for example.

In various examples, the controller 202 is coupled to the non-transitory machine-readable medium 204. In some examples, the non-transitory machine-readable medium 204 stores machine-readable instructions 206, 208, which, when executed by the controller 202, cause the controller 202 to perform some or all of the actions attributed herein to the controller 202. The machine-readable instructions 206, 208, when executed by the controller 202, cause the controller 202 to perform assistive depth of field analysis, for example. The machine-readable instruction 206, when executed by the controller 202, causes the controller 202 to receive images from the image sensor 205 including a first image and additional images. The machine-readable instruction 208, when executed by the controller 202, causes the controller 202 to perform an assistive depth of field analysis. To perform the assistive depth of field analysis, the machine readable instruction 208 causes the controller 202 to determine a depth of field of the first image, store the depth of field of the first image as a reference value, determine a depth of field of the additional images, and generate a serial signal representing a change in the depth of field of the additional images with respect to the reference value.

In various examples, the controller 202 receives the instruction to perform an assistive depth of field analysis responsive to start-up or boot-up of the electronic device 200. The controller 202 performs the assistive depth of field analysis using the techniques described above with respect to FIG. 1, for example.

Figure 3:
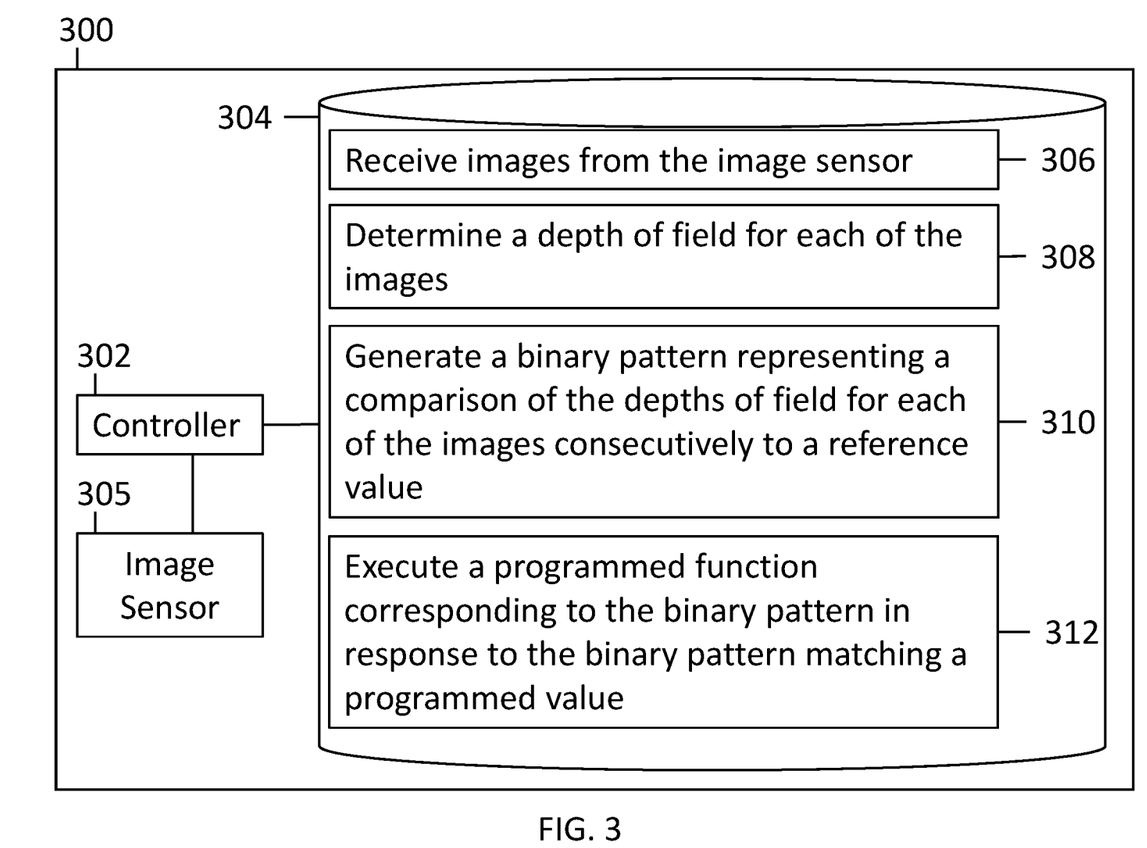
FIG. 3 shows a block diagram of an electronic device, in accordance with various examples.

Referring now to FIG. 3, a block diagram of an electronic device 300 is shown, in accordance with various examples. The electronic device 300 is the electronic device 100, for example. The electronic device 300 includes a controller 302, a non-transitory machine-readable medium 304, and an image sensor 305. The controller 302 is the controller 108, for example, and the non-transitory machine-readable medium 304 is the storage device 104, for example. The image sensor 305 is the image sensor 106, for example.

In various examples, the controller 302 is coupled to the non-transitory machine-readable medium 304. In some examples, the non-transitory machine-readable medium 304 stores machine-readable instructions 306, 308, 310, which, when executed by the controller 302, cause the controller 302 to perform some or all of the actions attributed herein to the controller 302. The non-transitory machine-readable medium 304 also stores machine-readable instruction 312, which is executable by the controller 302 or another component (not shown) of the electronic device 300. The machine-readable instructions 306, 308, 310, when executed by the controller 302, cause the controller 302 to perform assistive depth of field analysis, for example. The machine-readable instruction 306, when executed by the controller 302, causes the controller 302 to receive images from the image sensor 305. The machine-readable instruction 308, when executed by the controller 302, causes the controller 302 to determine a depth of field for the images. The machine-readable instruction 310, when executed by the controller 302, causes the controller 302 to generate a binary pattern representing a comparison of the depth of field for the images consecutively to a reference value. The machine-readable instruction 312, when executed by the controller 302 or another component of the electronic device 300, causes the electronic device 300 to execute a programmed function corresponding to the binary pattern in response to the binary pattern matching a programmed value.

In various examples, the controller 302 receives a command to perform the assistive depth of field analysis responsive to start-up or boot-up of the electronic device 300. The controller 302 performs the assistive depth of field analysis using the techniques described above with respect to FIG. 1, for example.

Figure 4:
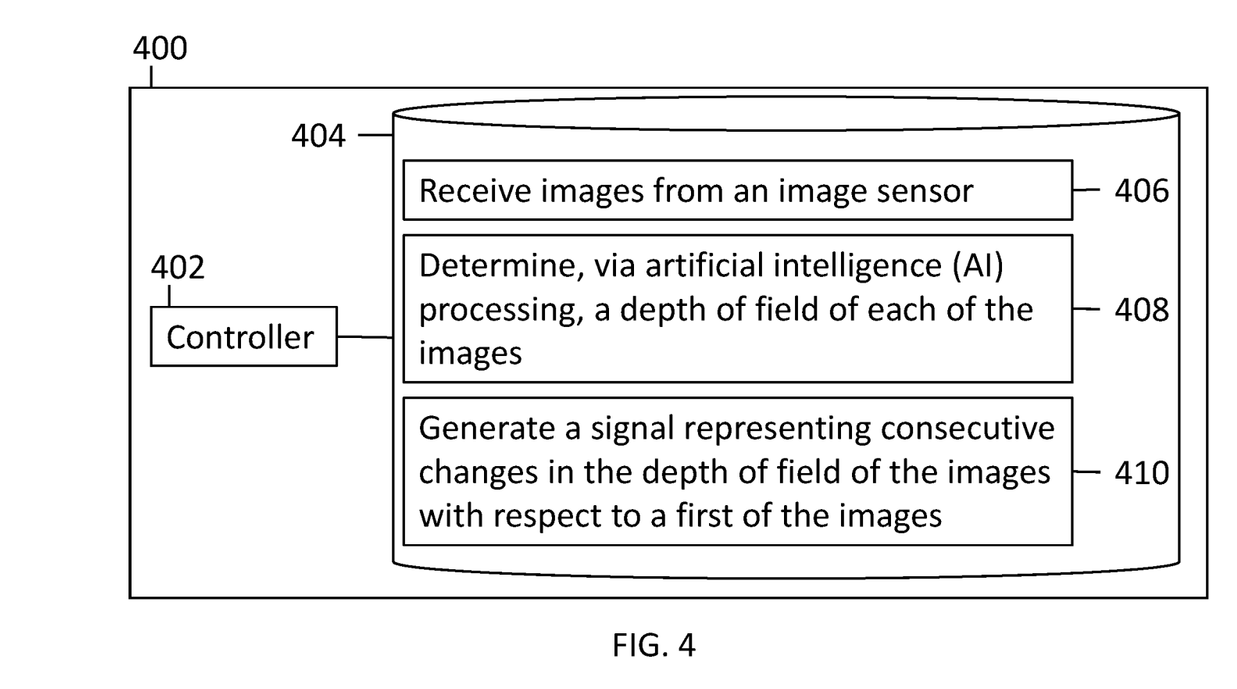
FIG. 4 shows a block diagram of an electronic device, in accordance with various examples.

Referring now to FIG. 4, a block diagram of an electronic device 400 is shown, in accordance with various examples. The electronic device 400 is the electronic device 100, for example. The electronic device 400 includes a controller 402 and a non-transitory machine-readable medium 404. The controller 402 is the controller 108, for example, and the non-transitory machine-readable medium 404 is the storage device 104, for example.

In various examples, the controller 402 is coupled to the non-transitory machine-readable medium 404. In some examples, the non-transitory machine-readable medium 404 stores machine-readable instructions 406, 408, 410, which, when executed by the controller 402, cause the controller 402 to perform some or all of the actions attributed herein to the controller 402, such as an assistive depth of field analysis. The machine-readable instructions 406, 408, 410, when executed by the controller 402, cause the controller 402 to perform assistive depth of field analysis, for example. The machine-readable instruction 406, when executed by the controller 402, causes the controller 402 to receive images from an image sensor. The machine-readable instruction 408, when executed by the controller 402, causes the controller 402 to determine, via AI processing, a depth of field of the images. The machine-readable instruction 410, when executed by the controller 402, causes the controller 402 to generate a signal representing consecutive changes in the depth of field of the images with respect to a first of the images.

In various examples, the controller 402 receives a command to perform an assistive depth of field analysis responsive to start-up or boot-up of the electronic device 400. The controller 402 performs the assistive depth of field analysis using the techniques described above with respect to FIG. 1, for example.

Figure 5:
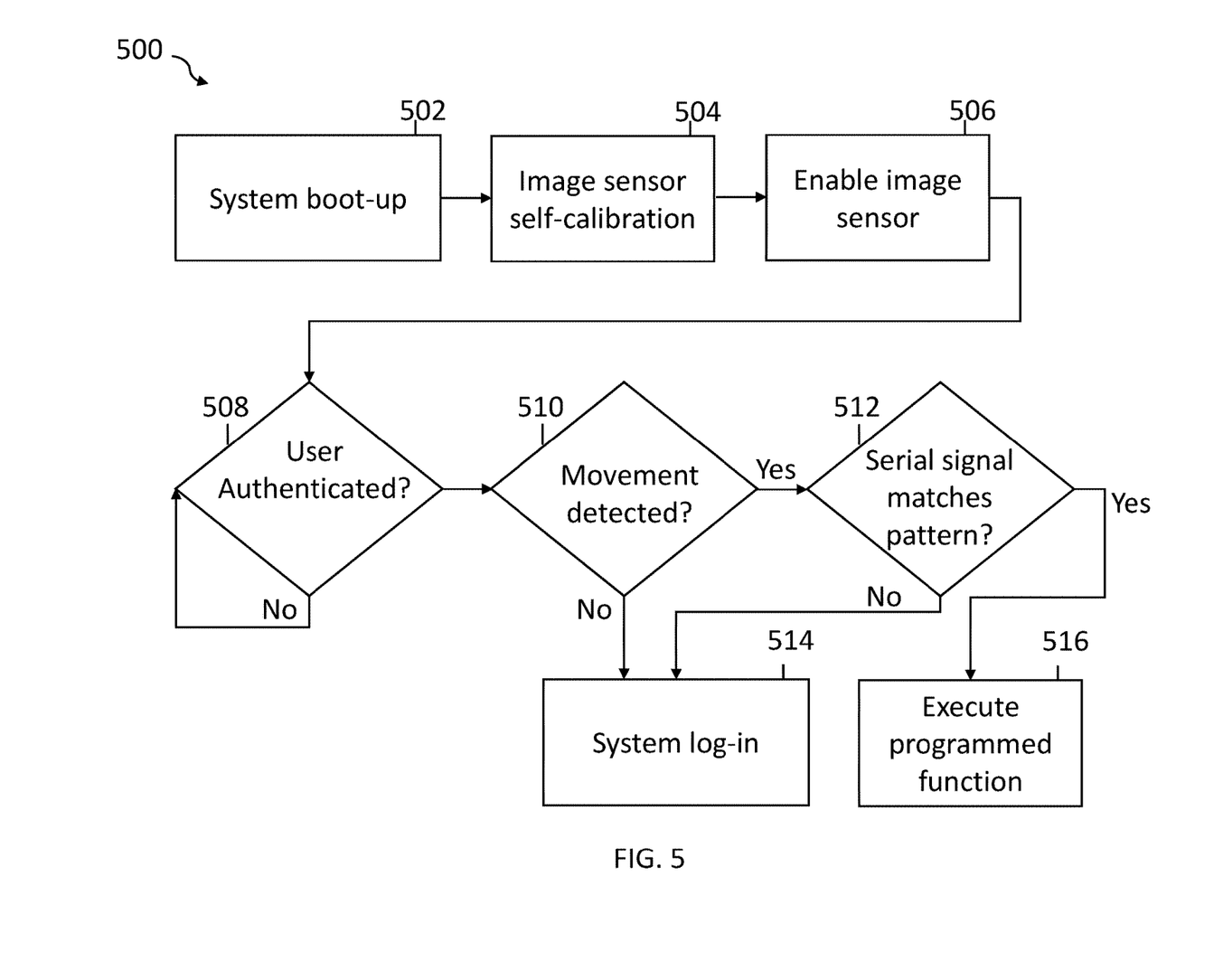
FIG. 5 shows a flow diagram of a method, in accordance with various examples.

Referring now to FIG. 5, a flow diagram of a method 500 for an electronic device (e.g., the electronic device 100, 200, 300, 400) for performing an assistive depth of field analysis is shown, in accordance with various examples. The method 500 includes the electronic device starting-up or booting-up, such as from a shutdown, sleep, hibernate, or other suspended or low power state (502). The method 500 also includes performing a self-calibration of an image sensor (504), such as the image sensor 106. The self-calibration may be of any suitable nature and include any suitable operations, such as preparing the image sensor to begin providing image data. The method 500 also includes initializing the image sensor to provide image data (506). In some examples, the initialization includes capturing a reference image, as described herein, for subsequent comparison to captured images having varying depths of field. The method 500 also includes evaluating an identity of a user of the electronic device (508). Evaluation of the user identify is performed according to a facial detection process performed on image data provided by the image sensor, for example. In some examples, responsive to the user being determined at operation 508 to not have authorization for accessing the electronic device, the method remains at operation 508 until an authorized user is identified.

The method 500 also includes sensing movement in the image data (510). The movement may be sensed by the electronic device determining a change to a depth of field of the image data, such as determined according to a depth of field analysis. The movement may be a movement of the image sensor, movement of an object or objects in view of the image sensor, or combinations thereof. A serial signal may be generated that includes pulses representing the movement with respect to a reference frame, such as captured previously in execution of the method 500, for example, at operation 504 or operation 506. The pulses may form a binary pattern having a first bit representative of the sensed movement being greater than, or in some examples equal to, a threshold amount with respect to the reference frame and a second bit representative of the sensed movement not being greater than (e.g., being less than) the threshold amount with respect to the reference frame.

Responsive to an amount of the movement exceeding the threshold amount, the serial signal is compared to programmed patterns (512). Responsive to the serial signal not matching a programmed pattern at operation 512, or movement not being detected at operation 510, in some examples, the electronic device logs-in to an operating system or user interface of the electronic device (514). In an example of the method 500 which includes the operation 508, execution of the operation 514 may also be contingent on successful authentication of the user identity at operation 508. Responsive to the serial signal matching a programmed pattern, the electronic device executes a programmed function corresponding to the programmed pattern (516). Various programmed functions are possible, such as described above with respect to FIG. 1.

In some examples of the method 500, the operation 504 and/or the operation 508 may be omitted, in which case operation of the method 500 proceeds from an operation preceding the omitted operation to an operation following the omitted operation.

Unless infeasible, some or all of the method 500 may be performed by a controller (e.g., the controller 108, 202, 302, 402) concurrently or in different sequences and by circuitry of an electronic device (e.g., the electronic device 100, 200, 300, 400), execution of machine-readable instructions of the electronic device (e.g., the machine-readable instructions 206, 208, the machine-readable instructions 306, 308, 310, 312, the machine-readable instructions 406, 408, 410), or a combination thereof. For example, the method 500 is implemented by machine-readable instructions stored to a storage device (e.g., the storage device 104, the non-transitory machine-readable medium 204, the non-transitory machine-readable medium 304, the non-transitory machine-readable medium 404, or another storage device not explicitly shown of the electronic device), components (some of which is not explicitly shown) of the electronic device, or a combination thereof. The controller executes the machine-readable instructions to perform some or all of the method 500, for example.

While some components are shown as separate components of the electronic device 100, 200, 300, 400, in other examples, the separate components are integrated in a single package. For example, the storage device 104 is integrated with the controller 108. The single package may herein be referred to as an integrated circuit (IC) or an integrated chip (IC).

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device comprising:
an image sensor;
a first controller; and
a second controller in communication with the first controller and the image sensor, wherein the second controller is to:
receive images from the image sensor including a first image and an additional image; and
perform an assistive depth of field analysis upon receiving a command from the electronic device responsive to a boot-up of the electronic device, wherein to perform the assistive depth of field analysis, the second controller is to:
determine a depth of field of the first image;
store the depth of field of the first image as a reference value;
determine a depth of field of the additional image; and
generate a serial signal representing a change in the depth of field of the additional image with respect to the reference value;
determine that the serial signal matches a programmed value;
in response to determining that the serial signal matches the programmed value, provide, to the first controller, a programmed function corresponding to the programmed value, wherein the first controller is to execute the programmed function.

2. The electronic device of claim 1, wherein the second controller is to generate the serial signal having respective first binary values representative of the determined depths of field of the additional image varying from the reference value by greater than a threshold amount and respective second binary values representative of the determined depths of field of the additional image varying from the reference value by less than the threshold amount.

3. The electronic device of claim 1, wherein the second controller is to:
evaluate, based on the first image or the additional image, an identity of a user of the electronic device; and
determine an authentication status of the user for interacting with the electronic device.

4. The electronic device of claim 1, wherein the second controller is to compare the serial signal to programmed patterns of binary values.

5. The electronic device of claim 4, wherein the first controller is to:
responsive to the serial signal matching a pattern of the programmed patterns, execute a programmed function corresponding to the programmed pattern; and
responsive to the serial signal not matching any of the programmed patterns, execute a second programmed function.

6. An electronic device comprising:
an image sensor;
a first controller; and
a second controller in communication with the first controller and the image sensor, wherein the second controller is to perform an assistive depth of field analysis upon receiving a command from the electronic device responsive to a boot-up of the electronic device, wherein to perform the assistive depth of field analysis, the second controller is to:
receive a first image and a second image from the image sensor;
determine a first depth of field for the first image;
determine a second depth of field for the second image; and
generate a binary pattern representing a comparison of the first depth of field and the second depth of field consecutively to a reference value,
determine that the binary pattern matches a programmed value;

provide, to the first controller, a programmed function corresponding to the programmed value, wherein the first controller is to execute the programmed function.

7. The electronic device of claim 6, wherein the programmed function includes logging in to an operating system of the electronic device and performing a function of an application of the electronic device operating via the operating system.

8. The electronic device of claim 6, wherein the second controller is to generate the binary pattern having respective first bit values representative of the determined depths of field of the images varying from the reference value by greater than a threshold amount and respective second bit values representative of the determined depths of field of the images varying from the reference value by less than the threshold amount.

9. The electronic device of claim 6, wherein the second controller is to authenticate a user of the electronic device based on facial detection performed on one of the images prior to executing the programmed function.

10. The electronic device of claim 6, wherein the electronic device is a laptop computer including the image sensor in a lid of the electronic device and the depths of field for the images change based on movement of a lid of the electronic device, movement of an object in front of the laptop computer, or combinations thereof.

11. A non-transitory computer-readable medium storing machine-readable instructions which, when executed by a first controller and a second controller of an electronic device, cause the electronic device to perform an assistive depth of field analysis to:
receive, at the second controller, images from an image sensor;
determine, via artificial intelligence (AI) processing, a depth of field of the images upon receiving a command from the electronic device responsive to a boot-up of the electronic device;
generate a signal representing consecutive changes in the depth of field of the images with respect to a first of the images;
determine that the signal matches a programmed pattern; and
in response to determining that the signal matches the programmed pattern, provide, to the first controller, a programmed function corresponding to the programmed pattern, wherein the first controller is to execute the programmed function.

12. The non-transitory computer-readable medium of claim 11, wherein the second controller is a dedicated controller for performing AI processing and is in communication with the first controller for executing an operating system of an electronic device.

13. The non-transitory computer-readable medium of claim 11, wherein the signal includes a binary pattern having first bit values representing the depth of field of the images varying from a depth of field of the first of the images greater than a threshold amount and a second bit values representing the depth of field of the images not varying from the depth of field of the first of the images greater than the threshold amount.

14. The non-transitory computer-readable medium of claim 11, wherein the instructions further cause the second controller to authenticate a user of the electronic device based on facial detection performed on one of the images prior to executing the programmed function.

15. The non-transitory computer-readable medium of claim 11, wherein the instructions further cause the second controller to compare the signal to a group of programmed patterns to determine whether the signal matches one of the programmed patterns.

16. The non-transitory computer-readable medium of claim 15, wherein the instructions further cause the second controller to: responsive to the signal not matching any of the programmed patterns, execute a second programmed function.

* * * * *